United States Patent Office 3,825,577
Patented July 23, 1974

3,825,577
METHOD OF PREPARING POLYFLUORINATED SULPHONIC ACID AND DERIVATIVES
Jean-Pierre Lalu, La Mulatiere, and Louis Foulletier, Oullins, France, assignors to Produits Chimiques Ugine Kuhlmann, Paris, France
No Drawing. Original application Aug. 18, 1969, Ser. No. 851,081. Divided and this application May 14, 1971, Ser. No. 143,589
Claims priority, application France, Aug. 21, 1968, 163,587
Int. Cl. C07f 7/24
U.S. Cl. 260—435 R          5 Claims

ABSTRACT OF THE DISCLOSURE

New products and compositions of matter complying with the general formula:

$$[C_nF_{2n+1}(CH_2)_bSO_2—Z]_dM$$

wherein: $C_nF_{2n+1}$ represents a straight or ramified branched perfluorinated chain: $n$ represents a whole number between 1 and 20, $b$ is a whole number between 2 and 20, preferably equal to 2 or 4, Z represents a chlorine, bromine or an oxygen atom (when Z is a chlorine or a bromine atom, M is nothing and $d$ is equal to 1), when Z is an oxygen atom: M is a hydrogen atom in which case, $d$ is equal to 1, M is a metal of the Groups $I_A$, $II_A$, $I_B$, $II_B$, VIII of the periodic table, the ammonium radical, the aluminum or the lead radical, and in which case $d$ represents the valence of this metal and methods for preparing new products as illustrated by the following representative reactions.

This application is a division of our application Ser. No. 851,081, filed Aug. 18, 1969.

SUMMARY OF THE INVENTION

The present invention involves new industrial compounds or products complying with the general formula:

$$[C_nF_{2n+1}(CH_2)_bSO_2—Z]_dM$$

wherein: $C_nF_{2n+1}$ represents a straight or ramified branched perfluorinated chain; $n$ represents a number between 1 and 20, $b$ is a whole number between 2 and 20, preferably equal to 2 or 4, Z represents a chlorine, bromine or an oxygen atom (when Z is a chlorine or a bromine atom, M is nothing and $d$ is equal to 1), when Z is an oxygen atom; M is a hydrogen atom and in which case, $d$ is equal to 1 or M is a metal of the Groups $I_A$, $II_A$, $I_B$, $II_B$, VIII of the periodic table, the ammonium radical, the aluminum or the lead radical and in which case $d$ represents the valence of this metal. The novel compounds are prepared as illustrated by the following representative reactions:

(1) 
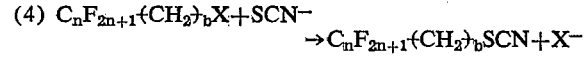
$$C_nF_{2n+1}(CH_2)_b\text{-SCN} \xrightarrow{Cl_2H_2O} C_nF_{2n+1}(CH_2)_b\text{-SO}_2Cl$$

(2) $C_nF_{2n+1}(CH_2)_bY + Na_2SO_3 \rightarrow$
$$C_nF_{2n+1}(CH_2)_bSO_3Na + NaY$$

wherein Y=Nr or I.

(3) $C_nF_{2n+1}(CH_2)_bSO_2Cl + 2NaOH \rightarrow$
$$C_nF_{2n+1}(CH_2)_bSO_3Na + NaCl + H_2O$$

wherein $n$ and $b$ are as represented above.

DESCRIPTION OF THE PREFERRED EMBODIMENT

The preparation of polyfluorinated sulphocyanides $C_nF_{2n+1}(CH_2)_bSCN$ used in reaction (1) has been described in the French Pat No. 1,861,360 of the applicant.

The oxidation of a polyfluorinated sulphocyanide having the formula $C_nF_{2n+1}(CH_2)_bSCN$ by the chlorine or the bromine is easily carried out when the sulphocyanide is dissolved in a suitable solvent as a reaction medium. It is preferred to use as a solvent a water-acetic acid mixture containing between 5 and 25% of the water by volume.

A reaction temperature between about 15° C. and 120° C., can generally be used but it is preferred to use a reaction temperature between 15° C. and 75° C.

During the reaction (1) a by-product is obtained, namely the polyfluoroalkane halide, whose formula is $C_nF_{2n+1}(CH_2)_bX$ wherein X is the chlorine or the bromine. The polyfluorinated sulphocyanide can be regenerated by reaction with an alkaline sulphocyanide according to the reaction:

(4) $C_nF_{2n+1}(CH_2)_bX + SCN^- \rightarrow$
$$C_nF_{2n+1}(CH_2)_bSCN + X^-$$

The following table indicates the boiling and the melting points of some products forming the subject of the invention. Owing to the reactivity of these products, the indicated values may show some inaccuracy.

|  | PE ° C. | PF ° C. |
|---|---|---|
| $C_2F_5—C_2H_4—SO_2Cl$ | 97°/100 mm |  |
| $C_4F_9—C_2H_4—SO_2Cl$ | 94°/20 mm |  |
| $C_6F_{13}—C_2H_4—SO_2Cl$ | 118–120°/20 mm |  |
| $C_8F_{17}—C_2H_4—SO_2Cl$ | 141°/20 mm | 62–3 |
| $C_{10}F_{21}—C_2H_4—SO_2Cl$ |  | 97–8 |

The action of a mineral sulphite on a polyfluoroalkane halide $C_nF_{2n+1}(CH_2)_bY$ (Y being the iodine or the bromine) as shown in equation (2) above is carried out under the classicial conditions of the Strecker's reaction. The reaction can be carried out in the presence of many solvents such as water, an alcohol (preferably ethanol), a ketone (preferably acetone), or an aprotic solvent (preferably dimethylformamide or dimethylsulphoxide). A mixture of solvents falling in the above classes can be used. It is preferred however, to use a mixture of water and ethanol, volume per volume.

The applicants have also discovered that the addition of a small quantity of copper turnings aids in the nucleophile attack of the polyfluoroalkane halide $$C_nF_{2n+1}(CH_2)_bY$$

by the sulphite ion.

The reaction can be carried out at a temperature between about 20 and 250° C., preferably between 50 and 150°. If the reaction temperature is above the boiling point of the reaction mixture or one of its constituents, it can be carried out in an autoclave (see Example 9).

The polyfluorinated sulphonates $$[C_nF_{2n+1}(CH_2)_bSO_3]_dM$$

as set forth in equation (3) above, may also be obtained by neutralizing the halides of polyfluorinated sulphonic acids $C_nF_{2n+1}(CH_2)_bSO_2Z$ with the aid of a base of the formula $M(OH)_d$ where M and $d$ have the meanings designated above. This neutralizing is carried out under the usual conditions for this kind of reaction. The reaction can be carried out in the presence of many solvents, such as water, an ether (such as isopropyl ether), a ketone (such as acetone) or their mixtures. It is preferred, however, to operate in the presence of water. The reaction temperature can be between about 10 and 100° C. but preferably at about 20° C. An increase in the reaction temperature, although it is not necessary, may accelerate the reaction owing to the solubility.

The new compounds of this invention are useful in the textile industry, and in the leather and paper industries. They can also be employed as corrosion inhibitory agents.

surface active agents and levelling agents. The compounds can thus be incorporated in waxes, greases, varnishes and paints to improve the spreading out and levelling of such viscous products.

The following examples illustrate the invention. In all the examples, when a fraction contains several constituents the mentioned percentages are molar percentages of the various compounds and the yields are referred to the starting fluorinated material.

EXAMPLE 1

Chlorine was bubbled to 20°, for 3 h. at the rate of 4 l./h., through a mixture of $C_2F_5$—$C_2H_4$—SCN (20.5 g.; 0.1 mole), icy acetic acid (100 cm.³) and water (12 cm.³ at 20° C. for 3 hours at the rate of 4 l./hour. After 1 hour and 45 minutes, the temperature rose to 61° C. in 15 minutes. It remained at this value for 15 minutes and then it gradually went down to the ambient temperature. The chlorine output was then stopped and the apparatus surged with a nitrogen flow for 30 minutes. A solid (4.1 g.) was then filtered from the reaction mixture the main constituent of which was ammonium chloride. The filtrate was distilled and 4 fractions and one residue was obtained as follows:

(a) Fraction 54–60°/100 mm., 58.1 g. was composed of water and acetic acid
(b) Fraction 62–5°/100 mm. Water (100 cm.³) was added to this fraction, and a dense phase was decanted (7.6 g.) composed of water (2.6%), acetic acid (11.6%) and $C_2F_5$—$C_2H_4$—$SO_2Cl$ (85.8%; 29.6 mmole)
(c) Fraction 62–92°/100 mm.; 4.8 g. was composed of $C_2F_5$—$C_2H_4$—Cl(1%), acetic acid (70%) and $C_2F_5$—$C_2H_4$—$SO_2Cl$ (29%; 12 mmole)
(d) Fraction 92–7°/100 mm.; 6.5 g. was composed of $C_2F_5$—$C_2H_4$—Cl (2.8%), $C_2F_5$—$C_2H_4$—$SO_2Cl$ (92.4%; 24.7 mmole) and three unindentified compounds (4.8%)
(e) Solid residue, 3.2 g. unidentified solid,
$C_2F_5$—$C_2H_4$—$SO_2Cl$ was obtained with a conversion rate of 66.5%.

EXAMPLE 2

Chlorine, at the rate of 4 l./hour, was bubbled at 50° C. for 3 hours and 30 minutes through a mixture of $$C_4F_9\text{—}C_2H_4\text{—}SCN$$

(30.5 g.; 0.1 mole), icy acetic acid (100 cm.³) and water (12 cm.³). After 30 minutes, the temperature rose to 75° C. and remained at this value for 30 minutes before gradually going down to the ambient temperature. After stopping the chlorine output, the apparatus was purged with a nitrogen flow for 30 minutes. A solid (3.9 g.) was then filtered from the mixture, the main constituent of which was ammonium chloride. The filtrate was distilled, two fractions and one residue were obtained:

(a) Fraction 50–64°/100 mm., constituted of water and acetic acid
(b) Fraction 90–95°/20 mm.; 27.4 g. composed of $C_4F_9$—$C_2H_4$—Cl (3.4%), $C_4F_9$—$C_2H_4$—SCN (12.3%/10 mmole) and $C_4F_9$—$C_2H_4$—$SO_2Cl$ (84.3%; 23.6 mmole)
(c) Solid residue 4.6 g. unidentified solid
$C_4F_9$—$C_2H_4$—$SO_2Cl$ was obtained with a conversion rate of 68% and a yield of 75.5%.

EXAMPLE 3

Chlorine, at the rate of 5 l./hour, was bubbled for 2 hours through a mixture of $C_6F_{13}$—$C_2H_4$—SCN (40.5 g.; 0.1 mole), icy acetic acid (100 cm.³) and water (12 cm.³). The reaction vessel was maintained at 63° C. The introduction of the chlorine caused a rise in the temperature to 72° C. after 30 minutes. This temperature remained stable for 30 minutes, then gradually went down to 63° C. The chlorine output was stopped and the apparatus purged with a nitrogen flow for 30 minutes. A mineral solid (4.9 g.) was removed from the mixture by filtering, the main component was ammonium chloride. The filtrate was distilled and 4 fractions and one residue were obtained as follows:

(a) 52–60°/100 mm.; composed of water and acetic acid
(b) 62–6°/100 mm.; 61 g. 50 cm.³ of water was added to this fraction, and a dense phase (1.5 g.) decanted composed of $C_6F_{13}$—$C_2H_4$—$SO_2Cl$ (68%; 2.4 mmole) and $C_6F_{13}$—$C_2H_4$—Cl (32%)
(c) 38–105°/20 mm.; 9.2 g.; $C_6F_{13}$—$C_2H_4$—Cl (51%);  $C_6F_{13}$—$C_2H_4$—$SO_2Cl$ (7%; 12.6 mmole)

Monochloroacetic acid (9.2%), acetic acid (31%)

(d) 108–115°/20 mm.; 33.4 g.; $C_6F_{13}$—$C_2H_4$—$SO_2Cl$ (85.4%; 65 mmole), $C_6F_{13}$—$C_2H_4$—Cl (14.6%; 11 mmole)
(e) Residue 1.5 g. unidentified.

$C_6F_{13}$—$C_2H_4$—$SO_2Cl$ was obtained with a conversion rate of 70% and a yield of 78.5%.

EXAMPLE 4

Chlorine, at the rate of 4 l./hour, was bubbled for 4 hours through a mixture of $C_8F_{17}$—$C_2H_4$—SCN (50.5 g.; 0.1 mole), icy acetic acid (100 cm.³) and water (12 cm.³). The reaction vessel was maintained at 50° C. 15 minutes after introducing chlorine, the temperature rose to 62° C. This temperature remained stable for 1 hour, and gradually went down to 50° C. The chlorine output was then stopped and the apparatus purged with a nitrogen bow for 30 minutes. A solid (52.8 g.) was filtered from the reaction mixture and recrystallized in 90 cm.³ of carbon tetrachloride. A mineral solid (4 g.) was removed by filtration in a hot state and the filtrate cooled down to 20° C., and a solid A (37.2 g.) filtered therefrom. The last filtrate was concentrated to 20 cm.³, which resulted in the precipitation of a solid B (7.4 g.) which was filtered therefrom. The solids A and B are identical and comply with the formula $C_8F_{17}$—$C_2H_4$—$SO_2Cl$. 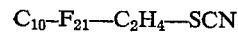 $C_8F_{17}$—$C_2H_4$—$SO_2Cl$ was obtained with a conversion rate of 81.5%.

EXAMPLE 5

Chlorine at the rate of 4 l./hour, was bubbled at 75° C. for 2 hours through a mixture of $$C_{10}F_{21}\text{—}C_2H_4\text{—}SCN$$

(30.3 g.; 0.05 mole), water (6 cm.³) and icy acetic acid (50 cm.³). After 30 minutes, the temperature rose to 80° C., and it remained at this value for 45 minutes and then gradually went down to 75° C. After stopping the chlorine output, the apparatus was purged with a nitrogen flow for 30 minutes. A solid (34 g.) was filtered from the reaction mixture and recrystallized in 200 cm.³ of carbon tetrachloride. The solid was collected (29.3 g.) which was composed of $C_{10}F_{21}$—$C_2H_4$—$SO_2Cl$ (83%; 38 mmole) and of
$C_{10}F_{21}$—$C_2H_4$—SCN (17%; 17.8 mmole)
$C_{10}F_{21}$—$C_2H_4$—$SO_2Cl$ was obtained with a conversion rate of 76% and a yield of 90%.

EXAMPLE 6

A mixture of $C_2F_5$—$C_2H_4$—I (27.4 g.; 0.1 mole), $Na_2SO_3$ (25 g.; 0.2 mole), water (50 cm.³), ethanol (50 cm.³) and a turning of copper (1 g.) was maintained at a temperature of 78° C. for 48 hours. The reaction mixture formed was a liquid and a solid. A solid A (26 g.) was obtained therefrom by filtration and washed with 25 cm.³ of water. A solid B (17 g.) remained. The filtrate was distilled and two fractions and one residue were obtained as follows:

(a) 49°/200 mm.: ethanol
(b) 60°/200 mm.: water
(c) residue

This residue was washed with 10 cm.³ of water and separated by filtering a solid C (6 g.). The solids B and C were collected and recrystallized in a water-ethanol mixture (50 cm.³ per 100 cm.³) 20.1 g. of $$C_2F_5-C_2H_4-SO_3Na$$

were collected which corresponds to a conversion rate of 80%.

EXAMPLE 7

It has been kept to 78° C. for 48 hours. A mixture of $C_4F_9-C_2H_4-I$ (37.4 g.; 0.1 mole), $Na_2SO_3$ (25 g.; 0.2 mole), water (50 cm.³), ethanol (50 cm.³) and a turning of copper (1 g.) were maintained at 78° C. for 48 hours in a suitable vessel. The reaction mixture was composed of a liquid and a solid. The solid was filtered therefrom (34.2 g.) and washed with 100 cm.³ of water before being recrystallized in water (50 cm.³). The recrystallization solid was polyfluorinated sulphonate $$C_4F_9-C_2H_4-SO_3Na,$$

which after drying at 120° C. weighed 17.2 g.

The filtrate was distilled and three fractions were obtained as follows:

(a) Fraction 60°/400 mm. This fraction was composed of two phases, they were stirred with 50 cm.³ of water and the two phases collected, by decanting, the densest phase (16.2 g.) was composed of $C_4F_9-C_2H_4-I$ (98%; 0.041 mole and ethanol (2%).
(b) Fraction 65°/400 mm.: ethanol
(c) Fraction 80°/400 mm.: water and few ethanol.

$C_4F_9-C_2H_4-SO_3Na$ was thus recovered with a conversion rate of 49% and a yield of 83%.

EXAMPLE 8

A mixture of $C_6F_{13}-C_2H_4-I$ (47.4 g.; 0.1 mole), $Na_2SO_3$ (25 g.; 0.2 mole), water (50 cm.³) and ethanol (50 cm.³) was maintained at 78° C. for 48 hours in a suitable reaction vessel. The reaction mixture resulting was a liquid and a solid. The solid was filtered therefrom and washed with 100 cm.³ of water, and after filtering, the solid was dried in a drying vessel at 120° C., 20 g. of $C_6F_{13}-C_2H_4-SO_3Na$ were thus obtained.

The filtrate was distilled and one fraction and one residue were obtained as follows:

(a) Fraction 49°/200 mm.: ethanol
(b) Residue. This residue contained water and a solid. The solid (0.9 g.) was filtered and was the sulfonate $C_6F_{13}-C_2H_4-SO_3Na$. The filtrate was evaporated and a solid (4.1 g.) whose origin is mainly mineral was obtained.

$C_6F_{13}-C_2H_4-SO_3Na$ was thus obtained with a conversion rate of 46.5%.

EXAMPLE 9

A mixture of $C_6F_{13}-C_2H_4-I$ (47.4 g.; 0.1 mole), $Na_2SO_3$ (25 g.; 0.2 mole), water (50 cm.³), ethanol (50 cm.³) and a turning of copper (1 g.) was maintained at 120° C. for 48 hours in an autoclave. The maximum pressure was 3 hrs. After cooling down the autoclave to 20° C., the reaction mixture was composed of a liquid and a solid. The solid was filtered and weighed 53 g. The solid was washed with 100 cm.³ of water and after filtering, it was recrystallized in one liter of water. The solid collected (35 g.) was the polyfluorinated sulphonate $C_6F_{13}-C_2H_4-SO_3Na$; the conversion rate amounted to 78%.

EXAMPLE 10

A mixture of $C_6F_{13}(C_2H_4)_2I$ (25 g.; 0.5 mole) $Na_2SO_3$ (12.5 g.; 0.1 mole), water (25 cm.³), ethanol (25 cm.³) and a turning of copper (0.5 g.) was maintained at 85° C. for 48 hours. The reaction mixture was composed of a liquid and a solid, and the solid was filtered therefrom. The solid weighed 28 g. and was washed with 50 cm.³ of water and recrystallized in ethanol (300 cm.³). The solid collected (19.2 g.) was the polyfluorinated sulphonate $C_6F_{13}(C_2H_4)SO_3Na$; the conversion rate was 80%.

EXAMPLE 11

20 cm.³ of NaOH (10 N) were rapidly added to $$C_8F_{17}-C_2H_4-SO_2Cl$$

(10.93 g.; 0.02 mole). During this addition, the temperature rose from 20 to 45° C. The mixture was then brought to and maintained at 100° C. for 4 hours. A solid was recovered therefrom by filtering. This solid was washed with water (3× 20 cm.³), dried and collected. The solid (10.9 g.) was the polyfluorinated sulphonate $$C_8F_{17}-C_2H_4-SO_3Na$$

The conversion rate amounted to 99%.

EXAMPLE 12

A mixture of $C_6F_{13}-C_2H_4-SO_2Cl$ (11.16 g.; 0.025 mole), water (40 cm.³) and sulphuric acid at 66° C. B (12 g.) was maintained at 100° C. for 8 hours. The mixture was then extracted with ethyl ether (4× 50 cm.³) and the ether eliminated or removed by distillation. The resulting residual solid was dried under vacuum. The dry solid obtained (8.8 g.) was the sulphonic acid $$C_6F_{13}-C_2H_4-SO_3H$$

melting between 73 and 79° C. The conversion rate was 82.5%.

EXAMPLE 13

Chlorine at the rate of 14 l./hour was passed for 4 hours through a mixture of $C_6F_{13}(CH_2-CH_2)_2SCN$ (108.5 g.; 0.25 mole), glacial acetic acid (200 cm.³) and water (27 cm.³), brought to a temperature of 52° C. The reaction being exothermic, the temperature rose from 52° C. to 72° C. in 30 minutes, then gradually went down to 55° C. The reaction mixture was then washed with water (twice 100 cm.³) at a temperature of 50° C. Thus a dense phase was recovered by decantation, which became solid by cooling down to 20° C. The solid thus obtained was finely crushed and washed with water (100 cm.³) at 20° C. The solid was filtered, then dried under vacuum. This solid (114.8 g.) was composed of $C_6F_{13}(CH_2-CH_2)_2SO_2Cl$ with a purity of 92%.

EXAMPLE 14

Chlorine at the rate of 12 l./hour was passed for 3 hours through a mixture of $C_8F_{17}(CH_2-CH_2)_2SCN$ (53.4 g.; 0.1 mole), glacial acetic acid (100 cm.³) and water (12 cm.³), brought to a temperature of 67° C. The reaction being exothermic the temperature rose from 67° C. to 75° C. in 30 minutes, then gradually went down to 67° C. in 2 hours. The reaction mixture was then washed with water (100 cm.³) at 50° C. Thus a dense phase was recovered by decantation, which became solid by cooling down to 20° C. The solid thus obtained was finely crushed and washed with water (100 cm.³) at 20° C. The solid was filtered, then dried under vacuum. This solid (51 g.) was composed of $C_8F_{17}(CH_2-CH_2)_2SO_2Cl$ with a purity of 95%.

It is to be understood that the phrase "glacial acetic acid" designates more accurately than the phrase "Icy acetic acid" the product mentioned in the present invention, in col. 3, line 13; col. 3, lines 46 and 68; col. 4, line 23; and col. 4, line 45.

We claim:
1. The method of preparing compounds of the formula $[C_nF_{2n+1}(CH)_bSO_3]_dM$ wherein M is a metal of Groups $I_A$, $II_A$, $I_B$, $II_B$ and VIII of the periodic table, an am- monium radical, aluminum or lead which comprises reacting a compound of the formula $C_nF_{2n+1}(CH_2)_bY$, wherein Y is bromine or iodine with a metal sulfite of Groups $I_A$, $II_A$, $I_B$, $II_B$, and VIII of the periodic table, ammonium sulfite, lead sulfite or aluminum sulfite in which $n$ is a number between 1 and 20, $b$ is a number between 2 and 20, and $d$ is equal to the valence of the metal.

2. The method of claim 1 in which the reaction is carried out in the presence of a solvent.

3. The method of claim 2 in which the solvent is a member of the group consisting of water, alcohol, ketones, an aprotic solvent or mixture thereof.

4. The method of claim 2 in which a small amount of copper is added to the reaction mixture.

5. The method of claim 1 in which the reaction temperature is between about 20 and 250° C.

References Cited

UNITED STATES PATENTS

| | | | |
|---|---|---|---|
| 1,851,102 | 3/1932 | Kalischer | 260—513 B |
| 1,867,793 | 7/1932 | Allardt | 260—513 B |
| 1,842,626 | 1/1932 | Assenbeck | 260—513 B |
| 2,694,723 | 11/1954 | Schramm | 260—513 B |
| 2,797,239 | 6/1957 | Schramm | 260—513 B |
| 2,732,398 | 1/1956 | Brice et al. | 260—430 X |
| 2,877,267 | 3/1959 | Tiers et al. | 260—543 |
| 3,222,251 | 12/1965 | Wyckoff et al. | 260—429 X |

HELEN M. S. SNEED, Primary Examiner

U.S. Cl. X.R.

260—429, 429.9, 430, 431, 438.1, 439, 448 R, 513 B

UNITED STATES PATENT OFFICE
CERTIFICATE OF CORRECTION

Patent No. 3,825,577          Dated July 23, 1974

Inventor(s) JEAN PIERRE LALU and LOUIS FOULLETIER

It is certified that error appears in the above-identified patent and that said Letters Patent are hereby corrected as shown below:

Column 1, line 5 reads "Chemiques" should be --Chimiques--.

Column 1, line 58 reads "$Cl_2H_2O$" should be --$Cl_2/H_2O$--.

Column 1, line 72 reads "Pat No 1,861,360" should be --Patent No. 1,561,360--.

Column 3, line 12 reads "4 l./h.," should be -- 4 l/h,--.

Signed and sealed this 21st day of January 1975.

(SEAL)
Attest:

McCOY M. GIBSON JR.
Attesting Officer

C. MARSHALL DANN
Commissioner of Patents